INVENTORS
JOHN PETER JACKSON
GORDON ANDREW BOYD
BY

*Pennie, Edmonds, Morton, Taylor & Adams*

ATTORNEYS

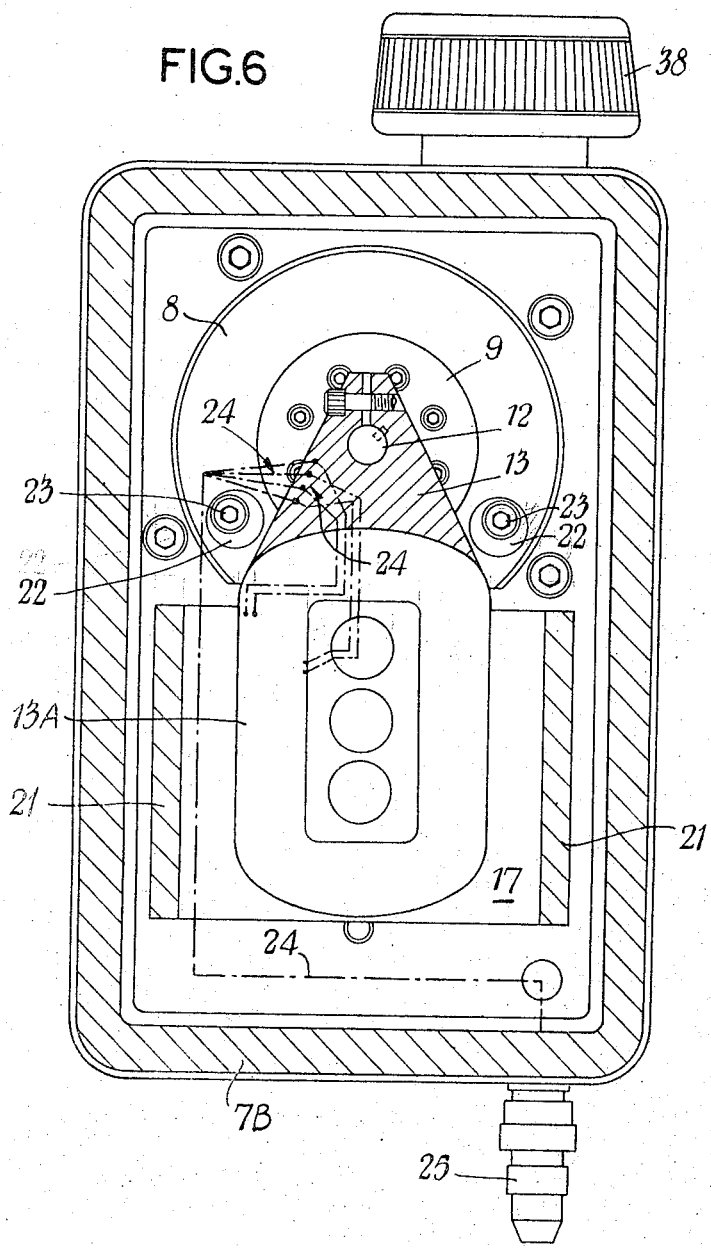

United States Patent Office 3,299,829
Patented Jan. 24, 1967

3,299,829
CONTROL DEVICES FOR HYDRAULIC PUMPS AND MOTORS
John Peter Jackson and Gordon Andrew Boyd, Dorset, England, assignors to Vickers-Armstrongs (Engineers) Limited, London, England, a British company
Filed Jan. 22, 1965, Ser. No. 427,430
Claims priority, application Great Britain, Jan. 24, 1964, 3,257/64
7 Claims. (Cl. 103—162)

This invention relates to control devices for hydraulic pumps and motors.

According to the present invention, there is provided a control unit or device for a hydraulic machine such as a pump or motor, of the kind having a controllable stroke and which includes a displaceable member arranged for varying the stroke and fluid operated means having an output member connected to said dispaceable member, the control device comprising a valve for connection to a source of hydraulic fluid under pressure, duct means connected with the valve for conveying fluid to and from such fluid operated means in accordance with the operative condition of the valve, an operating member for said valve, electromagnetic means having a coil unit connected to have electric current supplied thereto to cause the electromagnetic means to apply a control force to said operating member, and means for applying a restoring force to the operating member resulting from the displacement of such displaceable member, whereby, in the use of the device, operation of the means for applying a control force causes displacement of the valve operating member to cause the valve to direct fluid to the fluid operated means such that said displaceable member is displaced, thereby to alter the stroke of the hydraulic machine, such displacement causing the means for applying the restoring force to act for returning the valve operating member towards its initial position.

The terms "control force" and "restoring force" as used in the preceding paragraph and in the appended claims are intended to be respectively applicable to "control torque" and "restoring torque."

Figure 1:
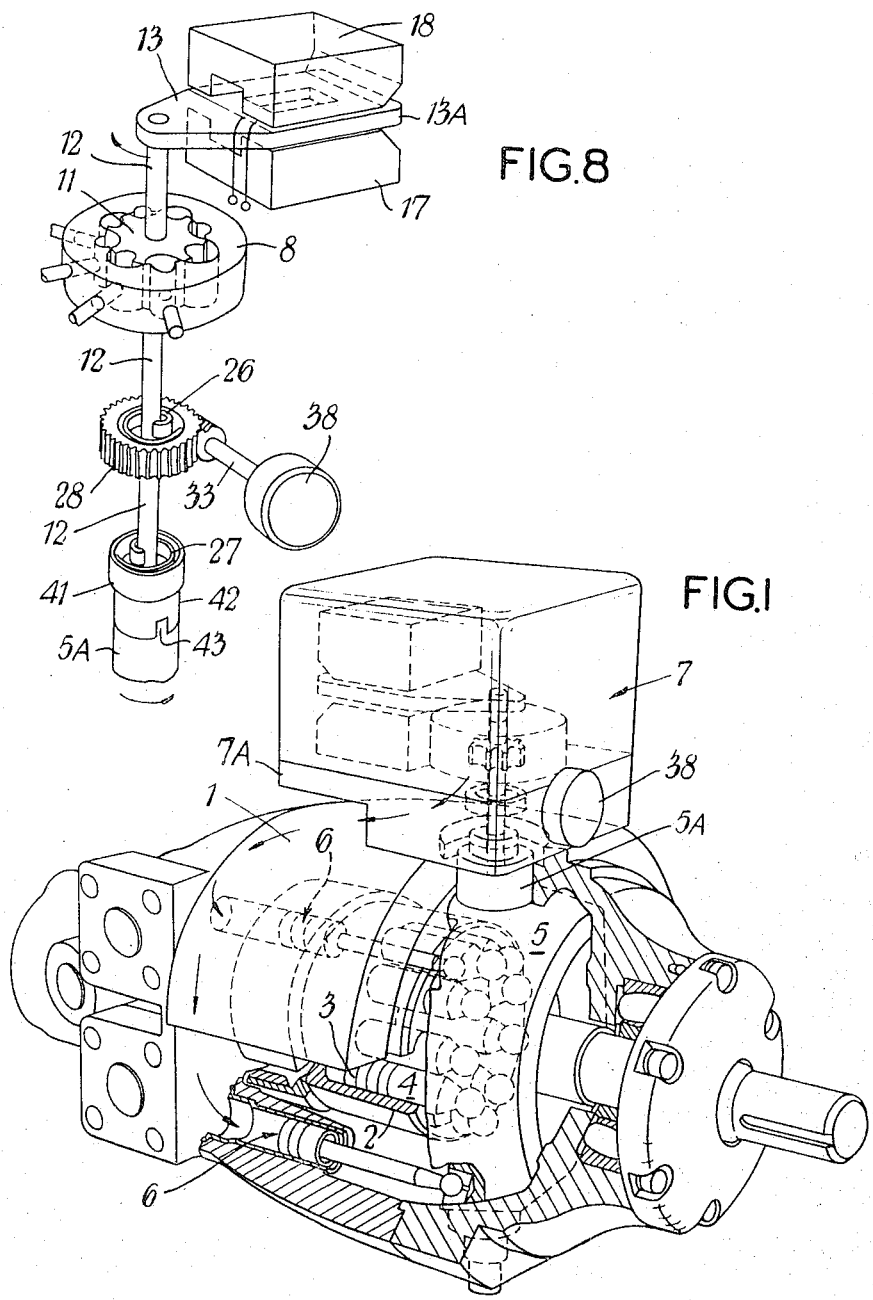
Figure 2:
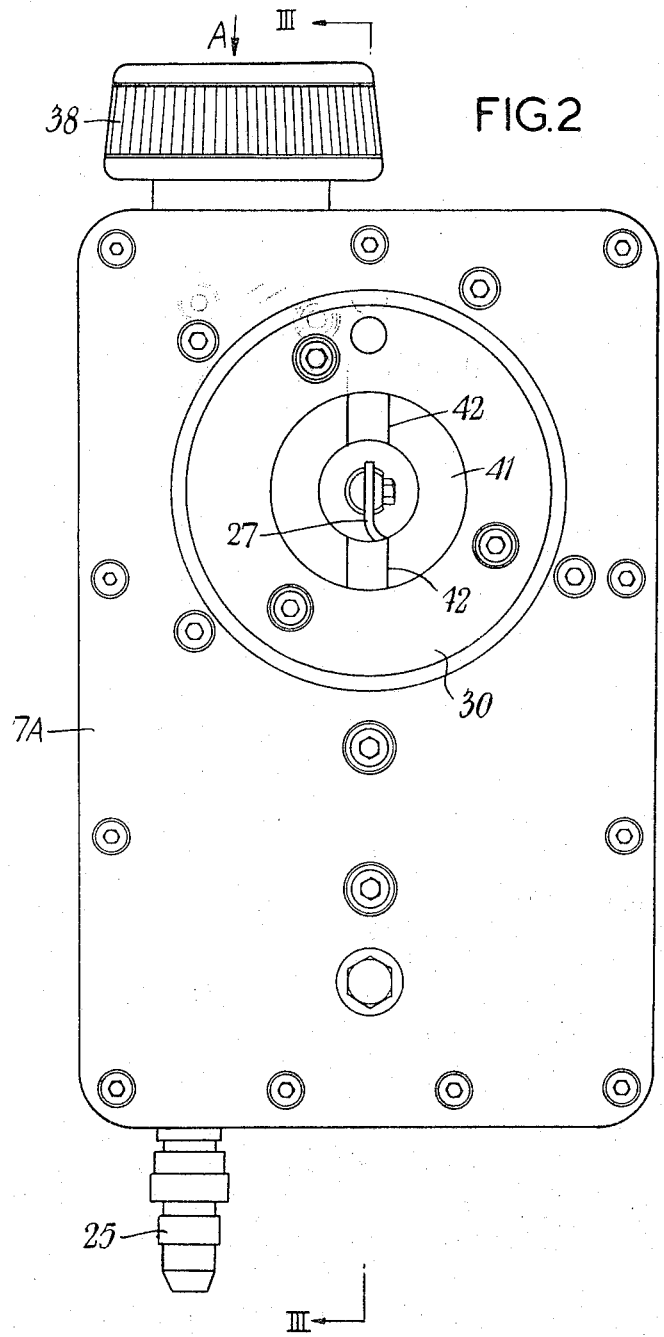
Figure 3:
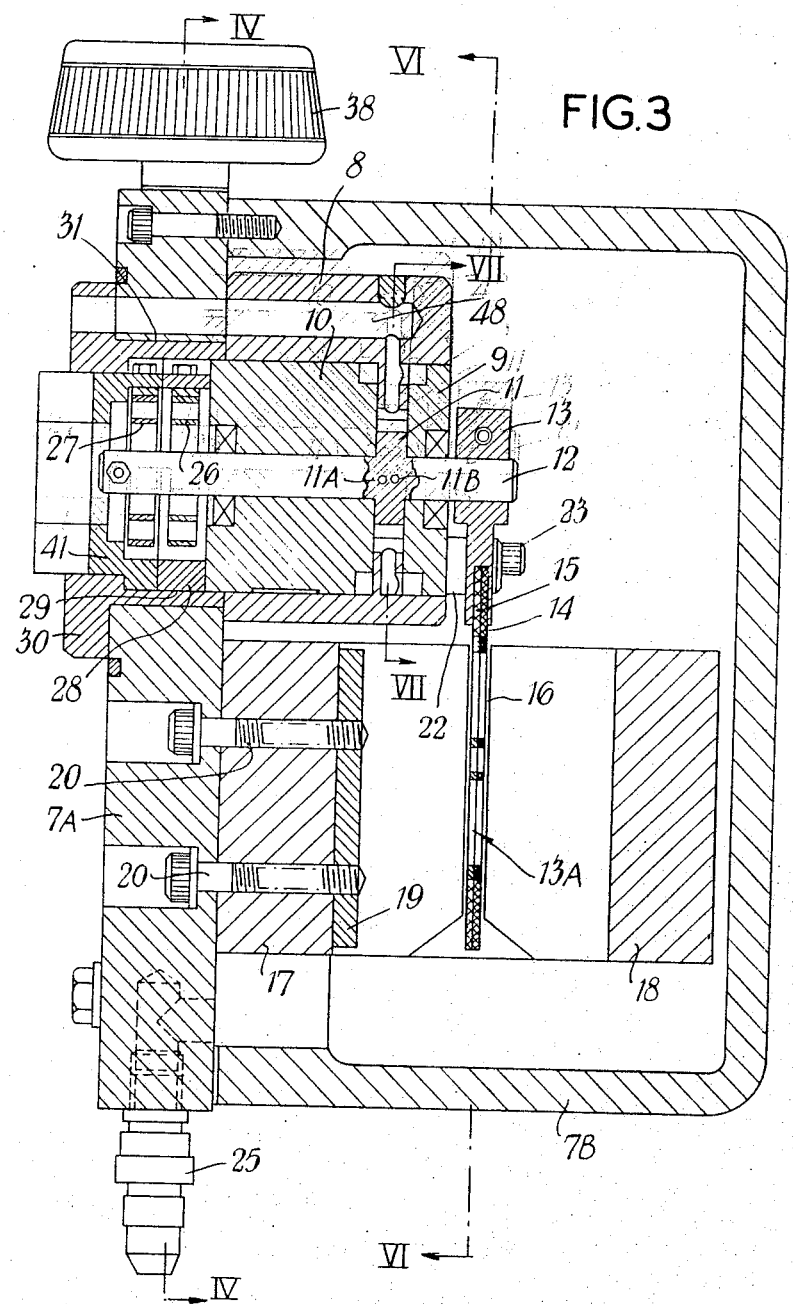
Figure 4:
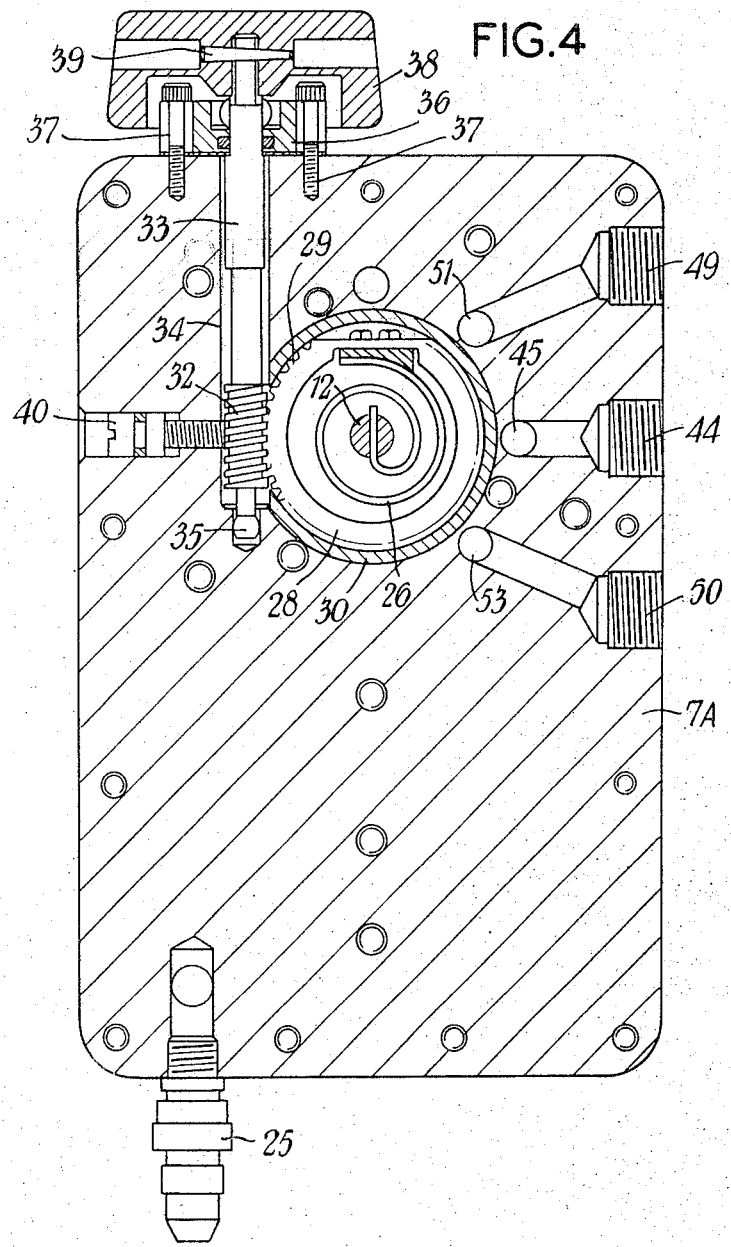
Figure 5:
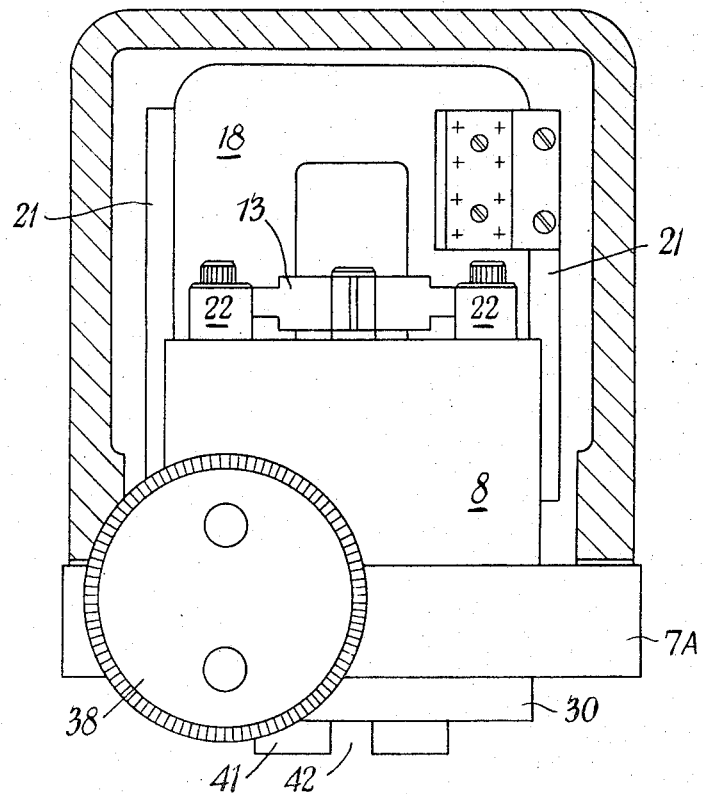
Figure 7:
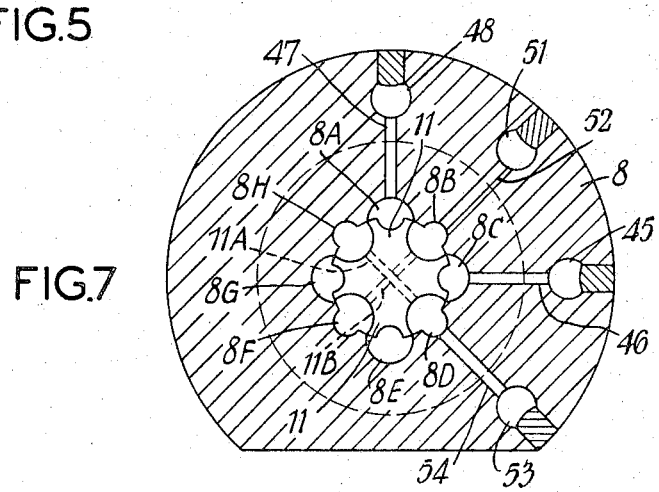

For a better understanding of the invention and to show how the same may be carried into effect, reference will now, by way of example, be made to the accompanying drawings, in which:

FIGURE 1 is a partly broken-away perspective view of a hydraulic swash plate pump with a control unit attached thereto, FIGURE 2 is, to an enlarged scale, an underneath plan view of the control unit, FIGURE 3 is a section on III—III of FIGURE 2, FIGURE 4 is a section on IV—IV of FIGURE 3, FIGURE 5 is a view in the direction of the arrow A with the cover of the control unit shown in section, FIGURE 6 is a section on VI—VI of FIGURE 3, FIGURE 7 is a section on VII—VII of FIGURE 3, and FIGURE 8 is a diagrammatic perspective view of certain parts of the control unit.

The pump is a V.S.G. (variable speed gear) machine having a casing 1 containing a rotary cylinder block 2 in which are formed a plurality of cylinders 3 with their axes parallel to the axis of rotation of the block. Each cylinder contains a plunger 4, the plungers projecting from one end of the block and co-operating with a swash plate carried by a tilt box 5, the angle of tilt of which is determined by the operation of four piston and cylinder assemblies 6 controlled by a control unit 7 so that the stroke of the plungers 4 can be adjusted to vary the delivery of the pump. In FIGURE 1 only two of the piston and cylinder assemblies 6 are shown, these being the ones on the near side of the pump. The other two assemblies 6 are on the opposite side of the pump. Since the present invention resides mainly in the control unit 7 it is thought unnecessary to describe the V.S.G. pump is greater detail since such machines are well known.

The control unit 7 has a base plate 7A to which a cover 7B is secured. A valve body 8 is attached to the plate 7A, the body having a bore in which are secured end caps 9 and 10. A valve rotor 11 is disposed between the caps 9 and 10, the rotor having a shaft 12 carried by the caps 9 and 10. The shaft 12 projects from the cap 9 and a coil carrier 13 is secured to the projecting part. A coil unit 13A having oppositely wound coils 14, 15 is fixed to the carrier 13 and depends therefrom into the air gap 16 of a magnetic circuit formed by two permanent U-shaped magnets 17, 18. Each magnet has its north pole opposite the south pole of the other magnet and vice versa. The magnet 17 is attached to the base plate 7A by a retaining plate 19 secured to the plate 7A by bolts 20 passed through the base part of the magnet 17. The magnet 18 is secured to the magnet 17 by side plates 21. Stops 22 are provided for limiting the swinging of the carrier 13 and the coil unit 13A. Each stop 22 is cylindrical in form and is secured to the valve body 8 by a bolt 23 passed eccentrically through the stop. It will be understood that by slackening the bolts 23 and turning the stops 22 the maximum extent of swinging of the carrier 13 and coil unit 13A can be adjusted. Conductors diagrammatically shown at 24 lead from the windings 14, 15 to an electrical connector unit 25 carried on the base plate 7A.

The shaft 12 projects from the end cap 10, the projecting part having the inner ends of two clock-type spiral springs 26, 27 secured thereto. The outer end of the spring 26 is secured to a ring-like housing 28 rotatably mounted in a bore 29 of a flanged bush 30 secured in an aperture 31 in the base plate 7A. The periphery of the housing 28 carries gear teeth 29 which mesh with a worm 32 mounted on a spindle 33. The spindle 33 is disposed in a blind bore 34 in the base plate 7A. The lower end of the spindle is rotatably supported in a recess 35 at the bottom of the bore 34. The upper end of the spindle 33 projects from the base plate 7A and is rotatably supported by a housing 36 secured to the base plate by bolts 37. The projecting extremity of the spindle 33 has an operating knob 38 fixed thereto by a tapered pin 39 passed through the spindle 33. A screw 40 is provided in the base plate for locking, when desired, the worm 32, spindle 33 and knob 38 against rotation. In use of the control unit 7 the screw 40 is positioned out of engagement with the worm 32. For locking purposes the screw 40 is turned and screwed in to abut the worm 32.

The outer end of the spring 27 is secured to a cylindrical housing 41 rotatably mounted in the bush 30. The housing 41 projects from the bush 30 and has a diametral slot 42 in which is engaged a tongue 43 on the top of the trunnion 5A of the tilt box 5.

An inlet port 44 for connection by a conduit (not shown) to a supply of hydraulic fluid under constant pressure is formed in the base plate 7A. The port 44 leads to a duct 45 that passes along the valve body 8 to communicate with a radially directed port 46. A radially directed port 47 in the valve body 8 communicates with a duct 48 that passes along the body 8 through the plate 7A and the flanged part of the bush 30 to communicate with the interior of the pump casing 1. A port 49 is formed in the plate 7A and is connected by a conduit (not shown) to the two piston and cylinder assemblies 6 that are on one side of the pump. A port 50 formed in the plate 7A is connected by a conduit (not shown) to the other two piston and cylinder assemblies 6 that are on the opposite side of the pump. The port 49 leads to a duct 51 that passes along the valve body to communicate with a radially directed port 52. The port 50 leads to a duct 53 that passes along the valve body 8 to communicate with a radially directed port 54. The valve body 8 has therein a valve chamber formed with pockets 8A to 8H. The port 47 leads to the pocket 8A, the port 52 to the pocket 8B, the port 46 to the pocket 8C and the port 54 to the pocket 8D. The valve rotor 11 has therein two diametral ports 11A and 11B which are spaced from each other across the thickness of the valve rotor 11. That is to say, the ports are not in the same plane and do not communicate with each other within the valve rotor 11. These ports serve to maintain the pocket 8B permanently in communication with the pocket 8F and the pocket 8D permanently in communication with the pocket 8H. Pocket 8A is permanently in communication with pocket 8E, and pocket 8c is permanently in communication with pocket 8g, by way of channels (not shown) in the valve body 8. Thus each pocket is always in communication with the one immediately opposite thereby to achieve complete hydraulic balance of the rotor 11.

It will be understood from the preceding paragraph that the pocket 8A leads to the pump casing 1, i.e. to exhaust, that the pocket 8C communicates with the port 44 to which hydraulic fluid under pressure is supplied, that the pocket 8B leads to the piston and cylinder assemblies 6 on one side of the pump whilst the pocket 8D communicates with the piston and cylinder assemblies 6 on the opposite side of the pump.

In use of the pump and control unit described above, the rotational forces, i.e. the torques, on the shaft 12 are initially balanced by manipulation of the knob 38 so that the valve rotor 11 is in its central valve closed position (that shown in FIGURE 7) with the tilt box 5 and thus the swash plate at zero angle of tilt. Hence, upon rotation of the cylinder block 2 of the pump the plungers 4 do not reciprocate in the cylinders 3 and there is no output from the pump. To displace the tilt box 5 and swash plate from the zero tilt position thereby to cause the plungers 4 to reciprocate in the cylinders 3, the torque on the shaft 12 is disturbed either electrically by causing an electric current to flow in one of the windings 14, 15, or mechanically by turning the knob 38. It will be understood that when a current is caused to flow in one of the windings 14, 15 this reacts with the field produced by the magnets 17, 18 whereby a turning moment is applied to the carrier 13 about the axis of the shaft 12. When the knob 38 is turned the worm 32 turns the housing 28 and thereby varies the torque applied to the shaft 12 by the spring 26. The change in the torque applied to the shaft 12 causes the latter to turn the valve rotor 11. Assuming the valve rotor is displaced anticlockwise (FIGURE 7) the hydraulic fluid under pressure flows from the pocket 8C, by virtue of the angular displacement of the rotor 11, to the pocket 8D and from thence via the port 54, duct 53 and port 50 to two of the piston and cylinder assemblies 6 on one side of the pump. From the other two piston and cylinder assemblies 6 fluid flows via the port 49, duct 51 and port 52 to the pocket 8B. From the pocket 8B, by virtue of the angular displacement of the rotor 11, the fluid flows into the pocket 8A and from thence via the port 47 and duct 48 to the pump casing 1, i.e. to exhaust. The piston and cylinder assemblies 6 thus have their pistons displaced to tilt the box 5 and swash plate so that housing 41 is also turned whereby there is applied to the shaft 12 through the spring 27 a restoring torque which counterbalances the control torque applied to the shaft 12 by the turning of the knob 38 or the energisation of one of the windings 14, 15. The shaft 12 returns to its initial position as does the valve rotor 11 so that the valve is again closed and the swash plate and tilt box 5 are maintained in their new position, where as the cylinder block 2 rotates the plungers 4 reciprocate with a particular stroke determined by the position of the swash plate and tilt box 5. Whilst the valve is open the swash plate and tilt box 5 move at a rate that is closely proportional to the opening of the valve. The stroke of the plungers 4 can be varied as desired by appropriately turning the knob 38 or applying a current of an appropriate magnitude to the winding 14 or the winding 15.

The pump having a control unit as described above can be incorporated in a control system governing the position or speed of a load, the pump being connected to drive a hydraulic motor the output shaft of which drives the load and an electrical device producing a signal in accordance with the load position or velocity. This signal is compared with a command signal set up externally and the difference applied through an amplifier, for example of the push-pull type, to control the current in the coil unit 13A.

If desired, a hydraulic actuator may be provided to which the output pressure of the pump is communicated, the actuator being mounted to apply to a lever extending from the carrier 13 laterally of the shaft 12 a force in correspondence with the pump output pessure. This enables a relationship to be obtained between pump delivery and pressure. If desired, when the hydraulic actuator is provided, the spring 27 may be omitted so that there is no mechanical connection between the tilt box 5 and the shaft 12. In this case the torque on the shaft 12 tending to return it to the valve closed position is provided by the hydraulic actuator. The pump is therefore pressure-controlled and not volumetric-delivery controlled as when the spring 27 connects the tilt box 5 and the shaft 12.

It is to be understood that although the control unit 7 has been described above as being employed in conjunction with a pump it could also be used in conjunction with a V.S.G. motor having a swash plate the angle of tilt of which is controlled by the unit.

What is claimed is:

1. A control device for a hydraulic machine of the kind having a controllable stroke and which includes a displaceable member arranged for varying the stroke and fluid-operated means having an output member connected to said displaceable member, the control device comprising a valve for connection to a source of hydraulic fluid under pressure, duct means connected with the valve for conveying fluid to and from such fluid operated means in accordance with the operative condition of the valve, an operating member for said valve, electromagnetic means having a coil unit connected to have electric current supplied thereto to cause the electromagnetic means to apply a control force to said operating member, and means for applying a restoring force to the operating member resulting from the displacement of such displaceable member, whereby, in the use of the device, operation of the means for applying a control force causes displacement of the valve operating member to cause the valve to direct fluid to the fluid operated means such that said displaceable member is displaced, thereby to alter the stroke of the hydraulic machine, such displacement causing the means for applying the restoring force to act for returning the valve operating member towards its initial position.

2. A control device as claimed in claim 1, further comprising spring means and a manually operable member for applying control force to the operating member through said spring means.

3. A control device as claimed in claim 1, wherein the coil unit is mounted on the operating member and cooperates with a permanent magnet.

4. A control device as claimed in claim 1, wherein the means for applying a restoring force to the operating member acts on the latter through spring means.

5. A control device as claimed in claim 1, wherein the means for applying a restoring force to the operating member is adapted to be connected to the displaceable member of the hydraulic machine.

6. A control device as claimed in claim 1, wherein the operating member is a shaft, wherein the control force is applied to the shaft as a torque and wherein the restoring force is also applied to the shaft as a torque.

7. A control device as claimed in claim 1, wherein the means for applying a restoring force to the valve operating member includes a hydraulic actuator connected to said operating member.

References Cited by the Examiner

UNITED STATES PATENTS

| | | | |
|---|---|---|---|
| 2,971,498 | 2/1961 | Bloch | 91—387 |
| 3,101,078 | 8/1963 | Evans | 91—387 |

DONLEY J. STOCKING, *Primary Examiner.*

R. M. VARGO, *Assistant Examiner.*